(12) United States Patent
Kim et al.

(10) Patent No.: US 10,719,906 B2
(45) Date of Patent: Jul. 21, 2020

(54) PROCESSING SYSTEM FOR GRAPHS AND OPERATING METHOD THEREOF

(71) Applicant: Daegu Gyeongbuk Institute of Science and Technology, Daegu (KR)

(72) Inventors: Min Soo Kim, Dalseong-gun Daegu (KR); Kyu Hyeon An, Uiwang-si (KR); Him Chan Park, Gyeryong-si (KR); Jin Wook Kim, Suseong-gu Daegu (KR); Se Yeon Oh, Cheongju-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 15/556,411

(22) PCT Filed: Dec. 28, 2016

(86) PCT No.: PCT/KR2016/015424
§ 371 (c)(1),
(2) Date: Sep. 7, 2017

(87) PCT Pub. No.: WO2018/124331
PCT Pub. Date: Jul. 5, 2018

(65) Prior Publication Data
US 2020/0043128 A1 Feb. 6, 2020

(51) Int. Cl.
*G06T 1/20* (2006.01)
*G06T 1/60* (2006.01)
(Continued)

(52) U.S. Cl.
CPC ............ *G06T 1/60* (2013.01); *G06F 12/1018* (2013.01); *G06F 16/2365* (2019.01); *G06F 16/2455* (2019.01)

(58) Field of Classification Search
CPC ............ G06F 12/1018; G06F 16/2365; G06F 16/2455; G06F 17/10; G06F 17/30;
(Continued)

(56) References Cited

U.S. PATENT DOCUMENTS

| 2005/0122339 | A1  | 6/2005 | Andrews et al. |
| 2010/0045682 | A1  | 2/2010 | Ford et al. |
| 2016/0034523 | A1* | 2/2016 | Aronovich ............ G06F 3/0641 707/692 |

FOREIGN PATENT DOCUMENTS

| KR | 1020150081638 A | 7/2015 |
| KR | 1020140148566 A | 5/2016 |

OTHER PUBLICATIONS

Malewicz, Grzegorz, et al. "Pregel: a system for large-scale graph processing." Proceedings of the 2010 ACM SIGMOD International Conference on Management of data. ACM, 2010 (Year: 2010).*

(Continued)

*Primary Examiner* — Diane M Wills (57) ABSTRACT

A graph processing system may include at least one auxiliary memory configured to store graph data including phase data and attribute data, a main memory configured to store a portion of the graph data, a plurality of graphics processing units (GPUs) configured to process the graph data received from the main memory and perform synchronization and including cores and device memories, and a central processing unit (CPU) configured to manage query processing associated with the graph data performed by the GPUs and store, in the auxiliary memory, updatable attribute data of a result of the query processing.

17 Claims, 8 Drawing Sheets

(51) Int. Cl.
*G06F 17/10* (2006.01)
*G06F 16/2455* (2019.01)
*G06F 16/23* (2019.01)
*G06F 12/1018* (2016.01)

(58) Field of Classification Search
CPC ....... G06F 17/305416; G06F 17/30445; G06F 17/30109; G06F 17/30097; G06F 17/30159; G06F 17/30174; G06F 17/30176; G06F 17/30224; G06F 17/3033; G06F 17/30466; G06F 17/30498; G06T 1/20; G06T 1/60
See application file for complete search history.

(56) References Cited

OTHER PUBLICATIONS

Seo H, Kim J, Kim MS. Gstream: A graph streaming processing method for large-scale graphs on gpus. InACM SIGPLAN Notices, Jan. 24, 2015 (vol. 50, No. 8, pp. 253-254). ACM (Year: 2015).*
Kim et al., "GTS: A Fast and Scalable Graph Processing Method based on Streaming Topology to GPUs", Department of Information and Communication Engineering, Daegu Gyeongbuk Institute of Science and Technology, Jun. 28, 2016, 15 pages.
Hyunseok, Seo, "GStream: A Graph Streaming Processing Method for Large-scale Graphs on GPUs", Dept. of Information and Communication Engineering, 2015, 45 pages including 41 pages English translation.

* cited by examiner

PROCESSING SYSTEM FOR GRAPHS AND OPERATING METHOD THEREOF

CROSS-REFERENCE TO RELATED APPLICATION

This application is a national phase claiming the benefit of and priority to International Patent Application No. PCT/KR2016/015424, entitled "PROCESSING SYSTEM FOR GRAPHS AND OPERATING METHOD THEREOF," filed Dec. 28, 2016, which is hereby incorporated by reference in its entirety.

TECHNICAL FIELD

Example embodiments relate to a system and method for processing a large graph using a graphics processing unit (GPU) and an auxiliary memory, and more particularly, to a system and method for processing large graph data stored in an auxiliary memory using a streaming method.

BACKGROUND ART

A graph processing system may perform a graph algorithm more rapidly, compared to a central processing unit (CPU), by using a graphics processing unit (GPU) having a higher throughput, or processing rate, than the CPU. In general, the graph processing system using such a GPU may use a device memory provided in the GPU to process a storable size of graph data or graphs.

In a case that the device memory processes a storable size of graph data, the processing may be performed more rapidly in comparison to the CPU due to a high throughput of the GPU. However, in a case that the device memory processes graph data of a size greater than the device memory, the graph data may be divided into a portion that may be stored in the device memory and a portion that may be stored in a main memory. Here, the GPU may process only the portion of the graph data stored in the device memory and the CPU may process the remaining portion of the graph data stored in the main memory, and thus graph-processing performance may decrease by an increase in a size of graph data.

In addition, in a case that the number of GPUs increases and the number of partitions to be obtained through division increases, phase data of graph data may be, more increasingly, duplicated among the GPUs and graph-processing performance may decrease accordingly. That is, scalability based on the increase in the number of GPUs may not be desirable.

Further, the graph processing system may process graph data only after storing entire graph data in the main memory. Thus, a size of graph data that is processible by the graph processing system may be determined based on a size of the main memory, and thus graph data of a size greater than the main memory may not be processed.

As described above, the importance of a method of processing large graph data is recognized. However, a more effective method of processing large graph data has yet to be developed.

DISCLOSURE

Technical Goals

An aspect provides a method of processing graph data of a size greater than a main memory by streaming large graph data stored in an auxiliary memory.

Another aspect also provides an extension-oriented strategy in addition to a performance-oriented strategy.

Technical Solutions

According to an aspect of the present disclosure, there is provided a graph processing system including at least one auxiliary memory configured to store graph data including phase data and attribute data, a plurality of graphics processing units (GPUs) configured to process the graph data, a main memory provided between the auxiliary memory and the GPUs and configured to cache at least a portion of the graph data, and a central processing unit (CPU) configured to control loading of the graph data based on whether updatable attribute data of the attribute data is storable in a device memory included in each of the GPUs.

The at least one auxiliary memory may store graph data with a capacity greater than a capacity of the main memory. The phase data may include information about peak points included in the graph data and information about a connection between the peak points, and the attribute data may include the updatable attribute data and read-only attribute data.

In response to the updatable attribute data being storable in the device memory of each of the GPUs, the CPU may store the updatable attribute data in the device memory of each of the GPUs and stream, to the GPUs, different phase pages and read-only attribute data corresponding to each of the phase pages.

In response to the updatable attribute data not being storable in the device memory of each of the GPUs, the CPU may divide the updatable attribute data and store the updatable attribute data obtained through the dividing in the device memory of each of the GPUs and stream, to the GPUs, same phase pages and read-only attribute data corresponding to each of the phase pages.

The CPU may compare a size of the updatable attribute data and a size of a device memory of a single GPU. In response to the size of the device memory of the single GPU being greater than or equal to the size of the updatable attribute data, the CPU may apply a performance-oriented execution strategy to process the graph data. In response to the size of the device memory of the single GPU being less than the size of the updatable attribute data, the CPU may apply an extension-oriented execution strategy to process the graph data.

The CPU may asynchronously stream the phase data from the auxiliary memory to the main memory, and asynchronously stream the phase data from the main memory to the device memory of each of the GPUs.

The phase data may include a plurality of pages having a variable size, and the pages may include slots. Each of the slots may include a page identification (ID) number configured by a byte, and a slot offset.

The CPU may include at least one of a loading controller configured to process a transmission of the graph data among the device memory of each of the GPUs, the auxiliary memory, and the main memory, an execution controller configured to determine an execution strategy to be used for query processing associated with the graph data based on a size of the graph data and a capacity of the device memories of the GPUs, a buffer manager configured to protect an area of the main memory based on whether a phase page to be transmitted to the device memory is present in the main memory during the query processing associated with the graph data, a control system configured to control the GPUs, or a result processor configured to store, in the auxiliary memory, a result of the query processing associated with the graph data.

The control system may control the loading controller to simultaneously read pages of phase data different between the at least one auxiliary memory using a hash operation, and load the read pages to the main memory, and control the device memories of the GPUs to process the graph data during the loading of the pages by the loading controller.

According to another aspect of the present disclosure, there is provided a graph processing method including copying updatable attribute data required for graph processing to device memories of GPUs based on an execution strategy used for the graph processing, verifying whether phase data required for the graph processing is loaded in a main memory, streaming the phase data loaded in the main memory to the device memories based on the execution strategy, performing a user defined kernel in which query processing based on the execution strategy is embodied, and synchronizing a result of the query processing based on the execution strategy.

The graph processing method may further include generating a loading list by determining phase data to be loaded to the main memory among pieces of phase data stored in at least one auxiliary memory, and loading phase data included in the loading list from the auxiliary memory to the main memory based on whether a loading space is present in the main memory.

The graph processing method may further include generating at least one access thread configured to access the auxiliary memory to load the phase data included in the loading list. Each of the at least one access thread may determine an auxiliary memory to be accessed through a hash operation with respect to a page ID of phase data to be loaded by each of the at least one access thread.

In response to the execution strategy for the graph processing being a performance-oriented execution strategy, the copying may include copying the updatable attribute data identically to the device memories of the GPUs, and the streaming may include copying different phase data to the device memories of the GPUs.

In response to the execution strategy for the graph processing being an extension-oriented execution strategy, the copying may include copying different portions of the updatable attribute data to the device memories of the GPUs, and the streaming may include copying same phase data to the device memories of the GPUs.

In response to the execution strategy being the performance-oriented execution strategy, the synchronizing may include collecting updatable attribute data stored in the device memories of the GPUs into a representative GPU among the GPUs, and synchronizing the collected updatable attribute data to the main memory.

In response to the execution strategy being the extension-oriented execution strategy, the synchronizing may include synchronizing updatable attribute data stored in the device memories of the GPUs to the main memory.

Advantageous Effects

According to example embodiments, by storing large graph data in an auxiliary memory and streaming the stored graph data, it may be possible to process graph data of a size greater than a main memory.

According to example embodiments, by providing an extension-oriented strategy in addition to a performance-oriented strategy, it may be possible to process large graph data based on a state of a system.

BEST MODE FOR CARRYING OUT THE INVENTION

Reference will now be made in detail to example embodiments of the present disclosure, examples of which are illustrated in the accompanying drawings, wherein like reference numerals refer to the like elements throughout. The example embodiments are described below in order to explain the present disclosure by referring to the figures.

Various changes, modifications, and equivalents of the methods, apparatuses, and/or systems described herein will be apparent after an understanding of the disclosure of this application. The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, in the description of example embodiments, detailed description of well-known related structures or functions will be omitted when it is deemed that such description will cause ambiguous interpretation of the present disclosure.

Figure 1:
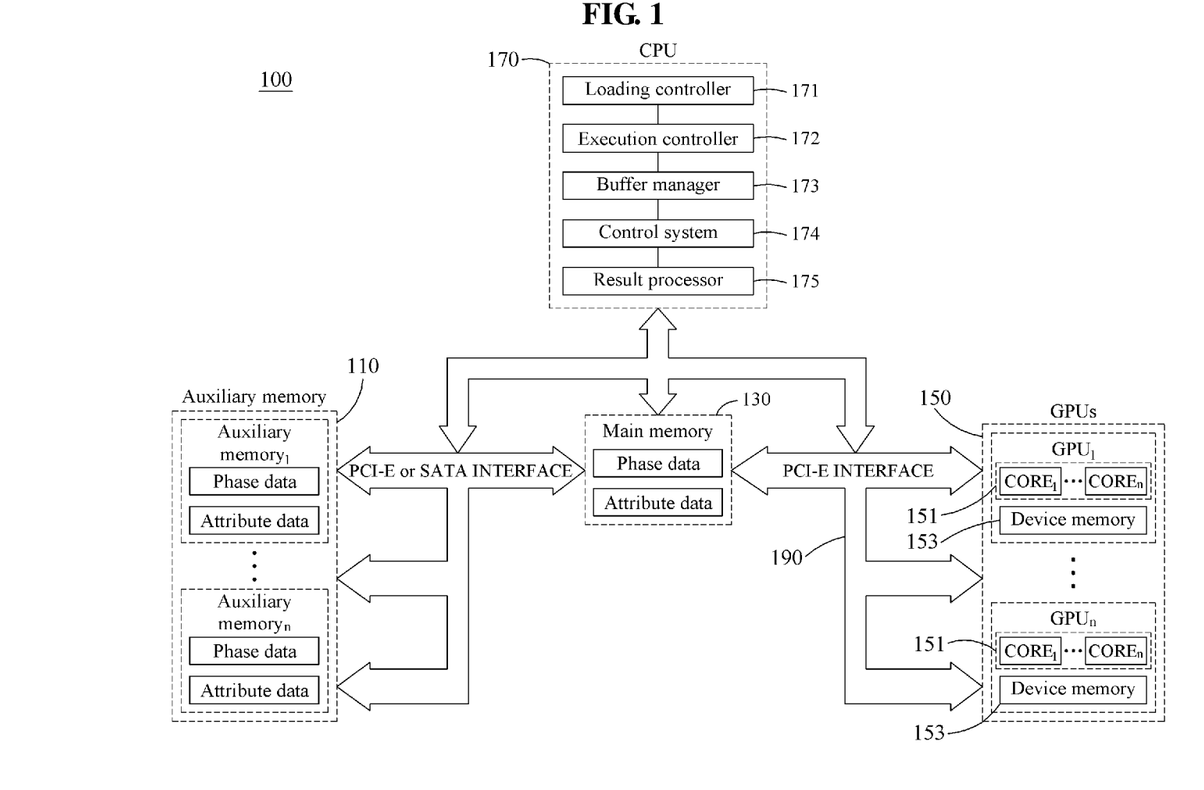
FIG. 1 is a diagram illustrating a structure of a graph processing system according to an example embodiment.

FIG. 1 is a diagram illustrating a structure of a graph processing system according to an example embodiment. Referring to FIG. 1, a graph processing system 100 includes at least one auxiliary memory 110, a main memory 130, and a plurality of graphics processing units (GPUs) 150, and a central processing unit (CPU) 170. The auxiliary memory 110, the main memory 130, the GPUs 150, and the CPU 170 may communicate with one another through a peripheral component interconnect (PCI)-express (PCI-E) interface 190. According to example embodiments, the PCI-E interface 190 may be replaced with various interfaces, for example, a serial advanced technology attachment (SATA) interface and the like.

The auxiliary memory 110 may store graph data. The auxiliary memory 110 may store graph data of a size greater than a capacity of the main memory 130.

The graph data may include phase data and attribute data. The phase data may include information about peak points included in the graph data, and information about a connection among the peak points, for example, information about an edge. The attribute data may be classified into read and write attribute data, hereinafter simply referred to as read/write attribute data (WA), and read-only attribute data (RA).

For example, in a breadth-first search (BFS), a search level for each of the peak points may correspond to the read/write attribute data. In addition, the attribute data may also include information additionally required to perform a graph algorithm. The graph algorithm may require the phase data and the attribute data. Hereinafter, updatable attribute data may be construed as having a same meaning as the read/write attribute data.

The main memory 130 may store at least a portion of the graph data. The main memory 130 may be provided between the auxiliary memory 110 and the GPUs 150, and may cache at least a portion of the graph data. The main memory 130 may store phase data and attribute data of graph data with a capacity greater than a capacity of each of device memories 153 of the GPUs 150.

The GPUs 150 may process the graph data, and synchronize the processed graph data. Each of the GPUs 150 may include a device memory and maximally n cores 151.

When the GPUs 150 process the graph data, the CPU 170 may manage the processing of the graph data. The CPU 170 may manage query processing associated with the graph data that is performed by the GPUs 150 and store, in the auxiliary memory 110, updatable attribute data in a result of the query processing.

As illustrated, the CPU 170 includes a loading controller 171, an execution controller 172, a buffer manager 173, a control system 174, and a result processor 179.

The loading controller 171 may process a transmission of the graph data among the device memories 153 of the GPUs 150, the auxiliary memory 110, and the main memory 130. For example, when phase data to be transmitted to the device memories 153 is not present in the main memory 130, the loading controller 171 may load phase data included in the auxiliary memory 110 to the main memory 130. Although to be described in detail, the phase data may be stored and transmitted in a form of a phase page.

The execution controller 173 may determine an execution strategy to be used for the query processing associated with the graph data based on a size of the graph data and a capacity of a device memory. For example, the execution controller 173 may determine the execution strategy based on whether the updatable attribute data of the attribute data of the graph data is storable in each of the device memories 153.

In detail, the execution controller 173 may compare a size of read/write attribute data and a size of a device memory of a single GPU, and process a performance-oriented execution strategy or an extension-oriented execution strategy. The size of the read/write attribute data of the attribute data of the graph data may increase in proportion to the number of peak points of a graph.

The execution controller 173 may also determine the execution strategy based on the number of the peak points of the graph, and a capacity of each of the device memories 153 of the GPUs 150. For example, when the size of the read/write attribute data is less than the capacity of each of the device memories 153 of the GPUs 150, the execution controller 173 may apply a performance-oriented execution strategy to process the graph data. For another example, when the size of the read/write attribute data is greater than the capacity of each of the device memories 153 of the GPUs 150, the execution controller 173 may apply an extension-oriented execution strategy to process the graph data. The performance-oriented execution strategy and the extension-based execution strategy will be described in greater detail with reference to FIGS. 6 and 7.

The buffer manager 175 may verify whether a phase page to be transmitted to the device memories 153 is present in the main memory 130 during the query processing associated with the graph data. In response to the phase page to be transmitted to the device memories 153 being present in the main memory 130, the buffer manager 175 may protect an area of the main memory 130 in order for the loading controller 171 not to overwrite a phase page that needs to be stored in the main memory 130.

The control system 174 may control the GPUs 150. For example, the control system 174 may store the read/write attribute data in the device memories 153 of the GPUs 150, and transmit the phase data and the read-only attribute data to the device memories 153 of the GPUs 150 through streaming to process the graph data.

The device memories 153 of the GPUs 150 may have a limited capacity. The control system 174 may store, in the device memories 153 of the GPUs 150, attribute data having a relatively smaller capacity than phase data and stream the phase data to process large graph data.

For example, the phase data may be transmitted to the device memories 153 of the GPUs 150 from the auxiliary memory 110 or the main memory 130 through the PCI-E interface 190. The control system 174 may process data already provided during the transmission of the phase data, and thus reduce an overhead for the transmission of the phase data.

A graph algorithm θ may be performed by a kernel function $K_\theta$ of each of the GPUs 150. The kernel function $K_\theta$ may be performed using each of the cores 151 of the GPUs 150. Each of the cores 151 of the GPUs 150 may process attribute data stored in a device memory and phase data streamed from the main memory 130 altogether.

For example, under the assumption that attribute data is X and phase data is Y, in which Y is $\{y_1, \ldots, y_n\}$ ($Y=\{y_1, \ldots, y_n\}$), a capacity of a device memory needed to process the graph algorithm θ is $|X|+|y_i|$. Here, reducing a value of $|X|$ or a value of $|y_i|$ may be needed to process a large graph using a device memory of a limited size. In general, $|X|>>|y_i|$, and thus the reducing may focus on reducing the value of $|X|$.

To reduce a capacity of each of the device memories 153, the control system 174 may maintain, in the device memories 153, only the read/write attribute data between the read-only attribute data and the read/write attribute data. In general, the read/write attribute data is frequently and randomly updated in the graph algorithm, and thus maintaining the read/write attribute data in the device memories 153 may be important for performance. The read-only attribute data may not be updated during the graph algorithm being performed, and thus the read-only attribute data may be transmitted to the device memories 153 along with corresponding phase data.

The read/write attribute data may be divided into W pieces (W=1 as a default), and the read-only attribute data may be divided into R sub-vectors. For example, the number of pieces of the read-only attribute data may be equal to the number of slotted pages. A slotted page, which is a data structure for storing phase data, will be described in detail with reference to FIG. 2.

The control system 174 may copy the read/write attribute data to the device memories 153 of the GPUs 150, and perform the graph algorithm while streaming, to the device memories 153, a slotted page corresponding to phase data along with the read-only attribute data.

The control system 174 may asynchronously stream the phase data to the device memories 153 of the GPUs 150 from the main memory 130 through the PCI-E interface 190.

The buffer manager 173 may allocate a buffer for read-only attribute data (RABuf) and a buffer for phase data, or a slotted page, (PBuf) to the device memories 153 of the GPUs 150. In addition, the buffer manager 173 may allocate a buffer for a piece of read/write attribute data (WABuf) to the device memories 153 of the GPUs 150.

The control system 174 may use streams of the GPUs 150 for the streaming. The control system 174 may transmit the read/write attribute data to the buffer (WABuf). The control system 174 may then transmit j-th phase data to the buffer (PBuf), j-th read-only attribute data to the buffer (RABuf), and initiate the streams of the GPUs 150 that perform the kernel function. Here, respective kernel functions of the streams of the GPUs 150 may be performed by temporally overlapping one another. The number of the streams, which is k, may be determined using a ratio between a transmission time of the j-th phase data and the j-th read-only attribute data and a kernel function performing time. Since the kernel function performing time varies based on the graph algorithm, an ideal number of streams may vary based on the graph algorithm.

According to an example embodiment, the phase data may be stored by being divided into a small page (SP) including a single page, and a large page (LP) including a plurality of pages. In such a case, the control system 174 may process small pages first, and then process large pages to reduce a kernel switching overhead.

According to an example embodiment, the graph algorithm may be classified into two types—a first-type graph algorithm of accessing a portion of a graph and a second-type graph algorithm of accessing an entire graph by linearly scanning peak points and edges. The first-type graph algorithm may induce a non-coalesced memory access duo to a non-normalized structure of the graph, although the first-type graph algorithm has a relatively smaller operation quantity or computational quantity. The second-type graph algorithm may have a relatively greater operation quantity, and may not greatly consider a scanning order of the peak points and the edges.

The method described in the foregoing may be suitable for processing a single iteration of the second-type graph algorithm. However, the first-type graph algorithm may require a level-unit search. The level-unit search may require an access to an extremely small portion of phase data, and not require streaming of the entire phase data. Each search may require streaming of only a set of phase data, or page, including visited peak points. Thus, the CPU 170 may use a set of identifications (IDs) of pages to be processed subsequently, for example, nextPIDSet, which includes IDs of pages to be accessed at a subsequent level.

In the level-unit search, a local-version set of IDs of pages to be processed subsequently by each of the GPUs 150 may be updated, and copied to the main memory 130. Local-version sets of IDs of pages to be processed subsequently may be incorporated into a global-version set of IDs of pages to be processed subsequently. At a next level, phase data, or page, included in the global-version set of IDs of pages to be processed subsequently may be transmitted to the GPUs 150. In such a method, the two different types of algorithms having different access patterns may be incorporated into a single framework.

After the buffer (RABuf) for read-only attribute data, the buffer (PBuf) for phase data, for example, a slotted page, the buffer (SPBuf) for a small page of phase data, and the buffer (LPBuf) for a large page of phase data are allocated to the device memories 153 of the GPUs 150, a residual space may be left in the device memories 153 of the GPUs 150. Since the buffer (WABuf) for a piece of read/write attribute data is extremely small in the first-type graph algorithm, a great residual space may be left in the device memories 153. In such a case, the GPUs 150 may use such a residual space for caching phase data, or page, to improve performance. The first-type graph algorithm may access same phase data, or page, iteratively during a search, and thus such a caching method may prevent an unnecessary transmission from the main memory 130 to the device memories 153. Table 1 below illustrates an example algorithm.

Referring to Table 1, G denotes an input graph. $K_{SP}$ and $K_{LP}$ denote a GPU kernel for small pages and a GPU kernel for large pages, respectively. nextPIDSet denotes a set of IDs of pages to be processed subsequently, cachedPIDMap$_{1:N}$ denotes IDs of pages cached in GPUs, and bufferPIDMap denotes IDs of pages buffered in a main memory. h( ) and g( ) denote hash functions, and a mod function may be used, for example. ∪ and ∩ denote a union and an intersection, respectively.

TABLE 1

Input: Graph G, /* input graph */
    $K_{SP}$, /* GPU kernel of Q for small pages */
    $K_{LP}$, /* GPU kernel of Q for large pages */
Variable: nextPIDSet, /* set of page IDs to process next */
        cachedPIDMap$_{1:N}$; /* cached page IDs in GPU$_{1:N}$ */
        bufferPIDMap; /* buffered page IDs in MMBuf */
 1:  /* Initialization */
 2:  Create SPStream and LPStream for GPU$_{1:N}$;
 3:  Allocate WABuf, RABuf, SPBuf, LPBuf for GPU$_{1:N}$;
 4:  if Q is BFS-like then
 5:     nextPIDSet ← page ID containing start vertex;
 6:  else
 7:     nextPIDSet ← ALL_PAGES;
 8:  cachedPIDMap$_{1:N}$ ← ∅;
 9:  if |G| < MMBuf then
10:    Load G into MMBuf;

TABLE 1-continued

```
11: Copy WA to WABuf of GPU_{1:N};
12: /* Processing GPU kernel */
13: repeat
14:     /* repeat Lines 15-31 for LPs */
15:     for j ∈ nextPIDSet.SP do
16:         if j ∈ cachedPIDMap_{h(j)} then
17:             Call K_{SP} for SP_j in GPU_{h(j)};
18:         else if j ∈ bufferPIDMap then
19:             Async-copy SP_j in MMBuf to SPBuf in GPU_{h(j)};
20:             Async-copy RA_j to RABuf in GPU_{h(j)};
21:             Call K_{SP} for SP_j in GPU_{h(j)};
22:         else
23:             Fetch SP_j from SSD_{g(j)} to MMBuf;
24:             Async-copy SP_j in MMBuf to SPBuf in GPU_{h(j)};
25:             Async-copy RA_j to RABuf in GPU_{h(j)};
26:             Call K_{SP} for SP_j in GPU_{h(j)};
27:     Thread synchronization in GPU;
28:     Copy WA of GPU_{1:N} to MMBuf;
29:     Copy nextPIDSet_{1:N} and cachedPIDMap_{1:N} to MMBuf;
30:     nextPIDSet ← U_{1≤i≤N} nextPIDSet_i;
31: until nextPIDSet = ALL_PAGES ∨ nextPIDSet = ∅
```

The result processor 179 may store, in the auxiliary memory 110, a result of the query processing associated with the graph data. For example, the result processor 179 may store, in the main memory 130, read/write attribute data updated by performing the graph algorithm, and synchronize the updated read/write attribute data.

Figure 2:
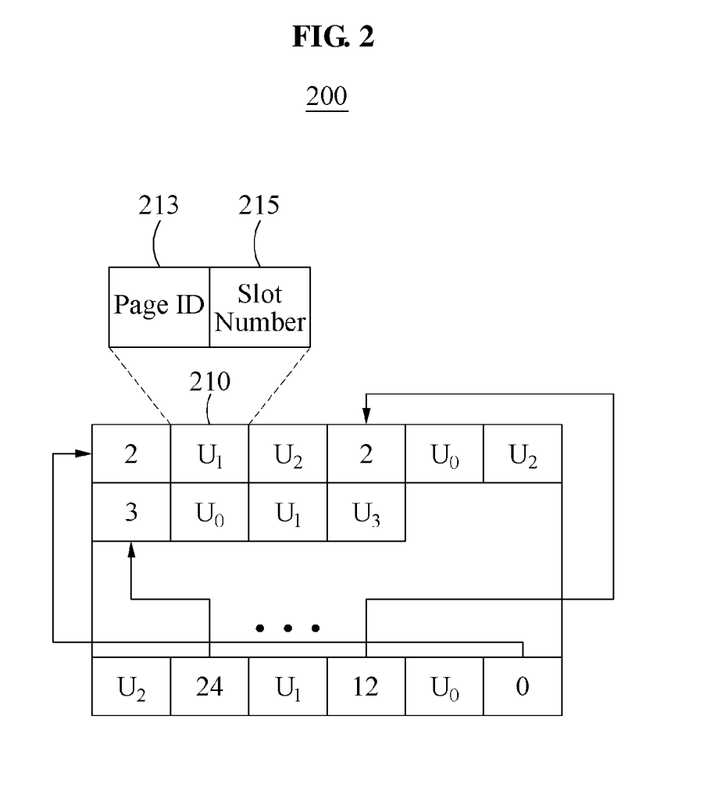
FIG. 2 is a diagram illustrating a configuration of a slotted page, which is a graph data structure, used in a graph processing system according to an example embodiment.

FIG. 2 is a diagram illustrating a configuration of a slotted page, which is a graph data structure, used in a graph processing system according to an example embodiment. FIG. 2 illustrates a structure of a slotted page 200, which is a graph data structure, used in a graph processing system.

Referring to FIG. 2, the slotted page 200 includes a record and a slot. The record may be stored from one end, for example, a front side, of the slotted page 200, and include information about the number of neighboring peak points adjacent to a peak point and information about the neighboring peak points. The slot may be stored from another end, for example, a rear side, of the slotted page 200. The slot may include an ID of a peak point and an offset indicating a start of a record corresponding to the peak point.

Information about a neighboring peak point, for example, $U_1$ 210, in the record may include a page ID 213 to which the neighboring peak point belongs, and a slot number 215 corresponding to the neighboring peak point in a corresponding page. The slot number 215 may also be represented as a slot offset.

According to an example embodiment, the slotted page 200 may have a preset size. In such a case, a page ID and a slot offset may also have respective preset sizes.

According to another example embodiment, the slotted page 200 may have a random size. In such a case, a page ID and a slot offset may also have respective random sizes. Such a method may be referred to as an extended two-level address notation. According to the extended two-level address notation, a large graph may be configured by a slotted page by indicating page ID information of a byte and slot offset information of a byte, and also a slotted page optimized for a size and a characteristic of the graph may be configured through various settings. In the extended two-level address notation, the page ID information of a byte may determine the number of slotted pages, and the slot offset information of a byte may determine a page size.

The slotted page 200 may be of a structure suitable for storing, in an auxiliary memory, phase data of a sparse graph. The phase data of the graph may be stored in a set of a plurality of slotted pages.

Figure 3:
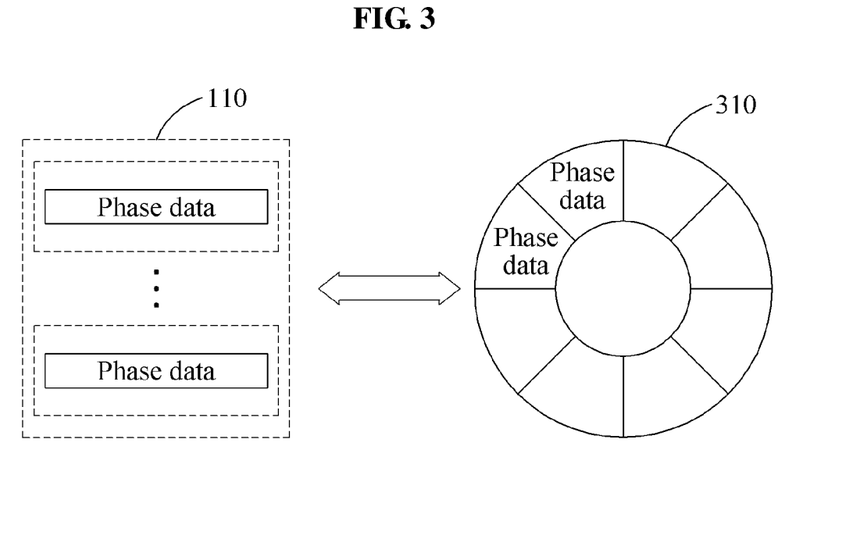
FIG. 3 is a diagram illustrating a data managing method performed by a buffer manager using a main memory and an auxiliary memory according to an example embodiment.

FIG. 3 is a diagram illustrating a data managing method performed by a buffer manager using a main memory and an auxiliary memory according to an example embodiment. FIG. 3 illustrates at least one auxiliary memory 110 in which graph data is stored, and a main memory including a loading space configured as a circular queue 310.

The graph data stored in the auxiliary memory 110 may be loaded to the main memory by a loading controller, and then transmitted to device memories (not shown) of GPUs by a control system.

The buffer manager may configure the loading space of the main memory as the circular queue 310, and manage the circular queue 310. The buffer manager may inform the loading controller of which location of the circular queue 310 is an available space. The buffer manager may prevent the loading controller from accessing a space of the circular queue 310 in which phase data yet to be transmitted to the device memories of the GPUs is included.

The buffer manager may determine, to be an available space or a loading space, a space of the circular queue 310 in which phase data that is not yet processed in query processing associated with current graph data is included, phase data transmitted to the device memories of the GPUs is included, or phase data is not yet included. According to an example embodiment, when a plurality of available spaces remains, the buffer manager may select, as a loading space, an oldest available space of the circular queue 310 using a least recently used (LRU) algorithm.

Figure 4:
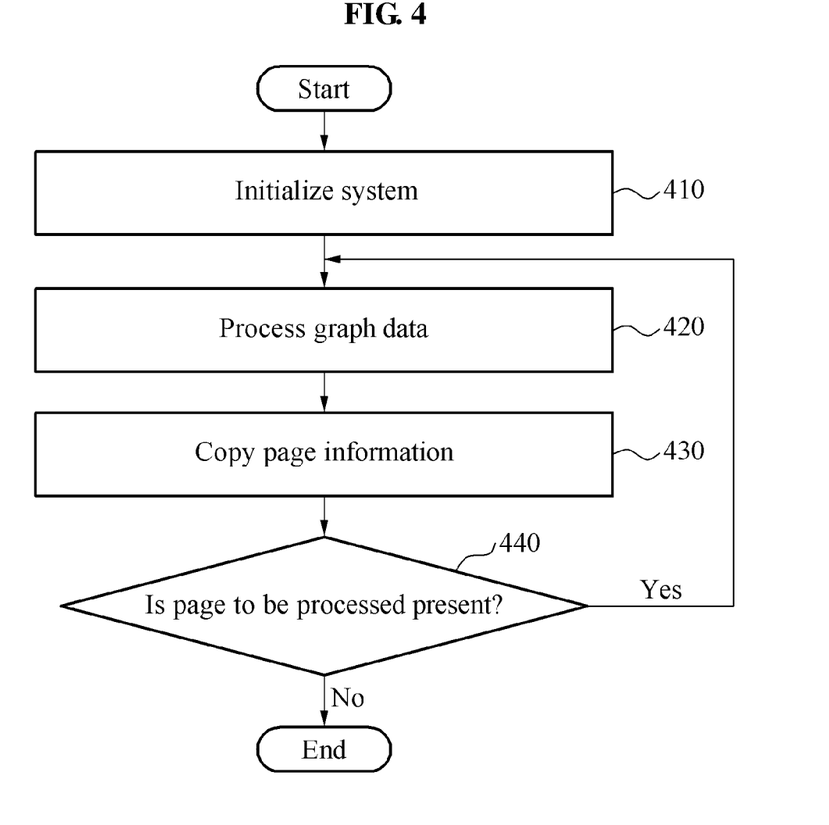
FIG. 4 is a flowchart illustrating a graph data processing method according to an example embodiment.

FIG. 4 is a flowchart illustrating a graph data processing method according to an example embodiment. Referring to FIG. 4, a CPU initializes a graph processing system in operation 410, and processes graph data in operation 420.

In operation 420, a control system controls a loading controller to simultaneously read phase pages different between at least one auxiliary memory using a hash operation, and load the read different phase pages to a main memory. The control system may control graph processing to be executed in device memories of GPUs during the loading of the phase pages by the loading controller. Here, the control system may control both a buffer manager and the loading controller to allow the loading controller to operate correctly. The control system may allow the main memory to be managed normally through communication between an execution controller and the buffer manager.

In addition, the control system may select a GPU by which a target query is to be processed from the GPUs based on an execution strategy, and inform the execution controller of the selected GPU. For example, in response to the execution strategy being a performance-oriented execution strategy, the control system may select an individual GPU using a hash function. In response to the execution strategy being an extension-oriented execution strategy, the control system may select all the GPUs. A graph data processing method performed by the control system will be described in detail with reference to FIG. 5.

In operation 430, the CPU copies page information to the main memory. In operation 430, the CPU may copy, to the main memory, information about a page that is stored in a current device memory and then used as a cache in next graph processing, and information about a page that is to be processed in the next graph processing.

In operation 440, the CPU verifies whether a page to be processed, or a page requiring processing, is in a processing request set. In response to the page to be processed being present as a result of operation 440, the CPU performs operations 420 through 440 repetitively on the page to be processed and being in the processing request set.

In response to the page to be processed not being present as the result of operation 440, the CPU terminates the operations.

Figure 5:
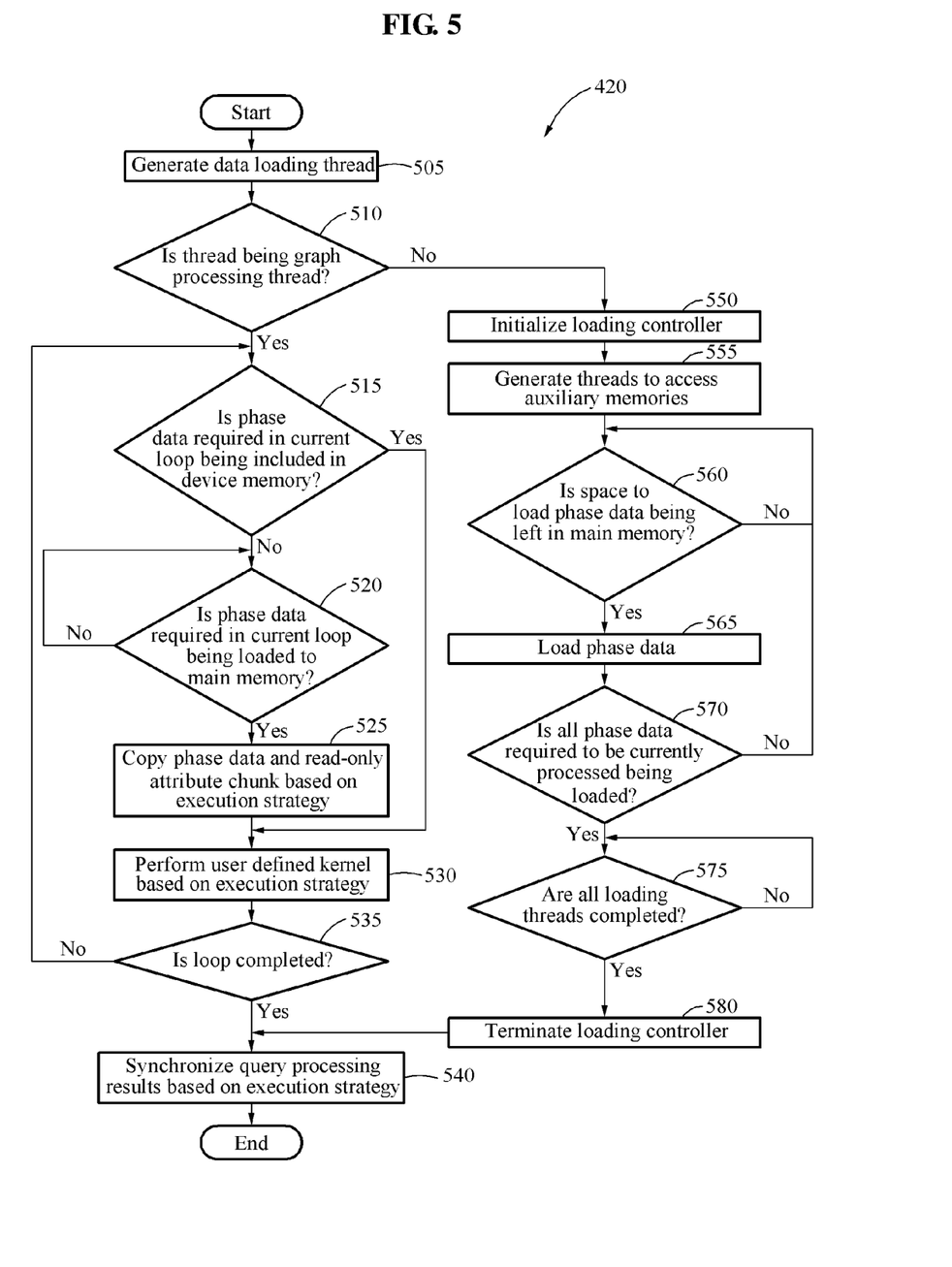
FIG. 5 is a flowchart illustrating an operating method of a graph processing system according to an example embodiment.

FIG. 5 is a flowchart illustrating an operating method of a graph processing system according to an example embodiment. Referring to FIG. 5, in operation 505, a control system generates a thread, or a loading thread, to be executed by a loading controller. Hereinafter, operations of the graph processing system may be performed based on a loading thread or a graph processing thread.

In operation 510, the control system determines whether a thread received after the loading thread is generated in operation 505 is a graph processing thread.

In operation 515, in response to the received thread being the graph processing thread as a result of the determining in operation 510, the control system verifies whether phase data required in a current loop is included in a device memory. In response to the required phase data being included in the device memory as a result of the verifying in operation 515, the control system performs a user defined kernel in which query processing is embodied through an execution controller based on an execution strategy.

In operation 520, in response to the required phase data not being included in the device memory as the result of the verifying in operation 515, the control system verifies whether the phase data required in the current loop is loaded to a main memory through a buffer manager.

In response to the required phase data not being loaded to the main memory as a result of the verifying in operation 520, the control system waits until the loading controller loads the phase data to the main memory.

In operation 525, in response to the required phase data being loaded to the main memory as the result of the verifying in operation 520, the execution controller copies, to the device memory, phase data and a read-only chunk based on the execution strategy. Here, the read-only chunk may indicate a chunk of entire read-only attribute data of graph data that corresponds to the phase data.

In operation 530, when a transmission to the device memory is completed, the control system performs the user defined kernel in which the query processing based on the execution strategy is embodied through the execution controller.

In operation 535, when the performing of the user defined kernel is completed, the buffer manager updates a space of the main memory used in the current loop to be an available space, and determines whether pages in a processing request set for the graph processing thread are all processed.

When the pages in the processing request set are not all processed as a result of the determining in operation 535, the control system repetitively performs operations 515 through 535 until all the pages are processed.

In operation 540, when all the pages in the processing request set are processed as the result of the determining in operation 535, the control system synchronizes a result of the query processing based on the execution strategy.

In operation 550, in response to the received thread not being the graph processing thread, or the received thread being the loading thread, as the result of the determining in operation 510, the control system initializes the loading controller. In operation 550, the control system verifies the processing request set to be processed in current graph processing. The control system verifies phase data currently loaded in the main memory through the buffer manager, determines which phase data is to be loaded by the loading controller, and initializes the loading controller that generates a loading list.

In operation 555, the control system generates a thread, hereinafter an access thread, to access at least one auxiliary memory. According to an example embodiment, an access thread may correspond to an auxiliary memory, and a plurality of access threads may be generated in a case of using a plurality of auxiliary memories.

In operation 560, the control system verifies whether a loading space is left in the main memory to load phase data through the buffer manager. In operation 560, the control system verifies whether a space for loading phase data of each of the access threads generated in the loading thread is left in the main memory.

In response to the loading space not being present in the main memory as a result of the verifying in operation 560, the control system waits until the loading space is generated.

In operation 565, in response to the loading space being present in the main memory as the result of the verifying in operation 560, the control system loads the phase data of each of the access threads to the main memory from the auxiliary memory. Here, the access threads may determine an auxiliary memory to be accessed using a hash operation for an ID of a page to be loaded by each thread.

In operation 570, the control system determines whether phase data to be loaded is left in the loading list. In response to the phase data to be loaded being left in the loading list as a result of the determining in operation 570, the control system repetitively performs such a loading process in operations 560 through 570 until no phase data to be loaded is left in the loading list.

In operation 575, in response to the phase data to be loaded not being left in the loading list as the result of operation 570, the control system determines whether all loading threads are completed. When all the loading threads are not determined to be completed in operation 575, the control system waits until all the loading threads are completed.

When all the loading threads are determined to be completed in operation 575, the control system terminates the loading controller in operation 580, and synchronizes the result of the query processing based on the execution strategy in operation 540. When the loading controller is terminated, and all phase page lists in the processing request set of the graph processing thread are processed, the control system synchronizes the result of the query processing based on the execution strategy.

In operation 540, in response to the execution strategy being a performance-oriented execution strategy, the control system collects results of query processing associated with read/write attribute data stored in a device memory of each GPU into a device memory of a representative GPU as read/write attribute data. The control system copies the collected read/write attribute data to the main memory and performs synchronization.

In operation 540, in response to the execution strategy being an extension-oriented execution strategy, the control system copies, to the main memory, read/write attribute data stored in device memories of all the GPUs and performs synchronization.

Figure 6:
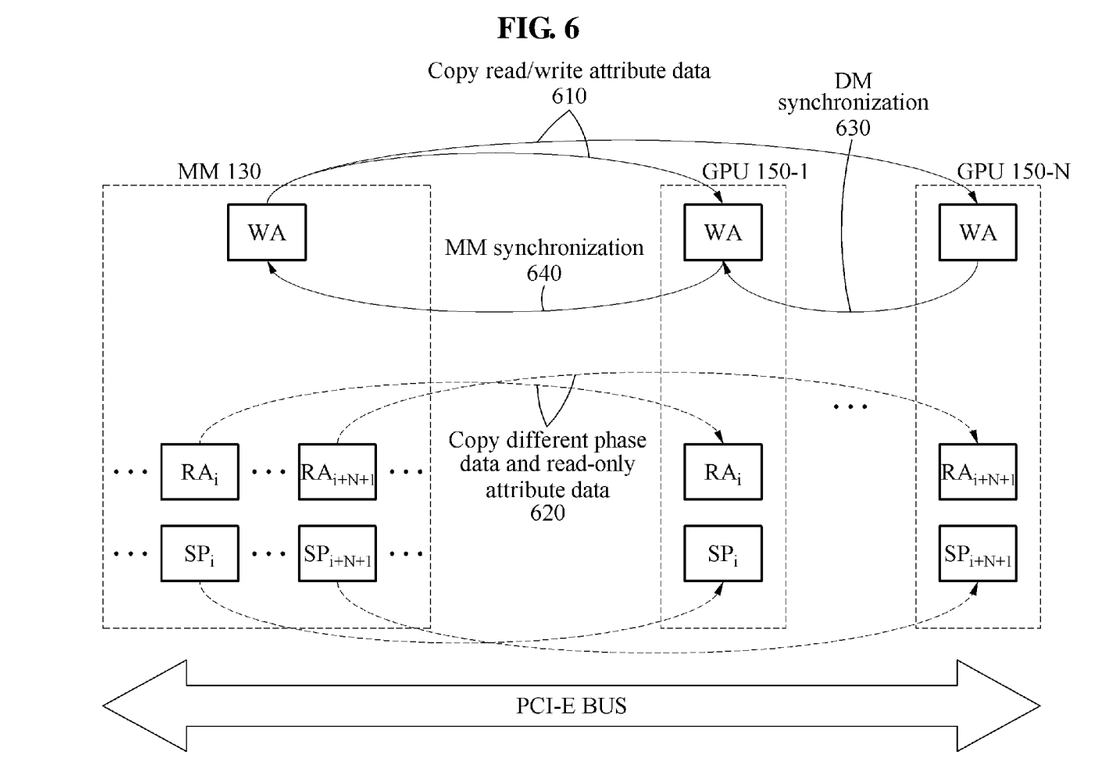
FIGS. 6 and 7 are diagrams illustrating a data flow and a synchronization flow based on an execution strategy according to an example embodiment.
Figure 7:
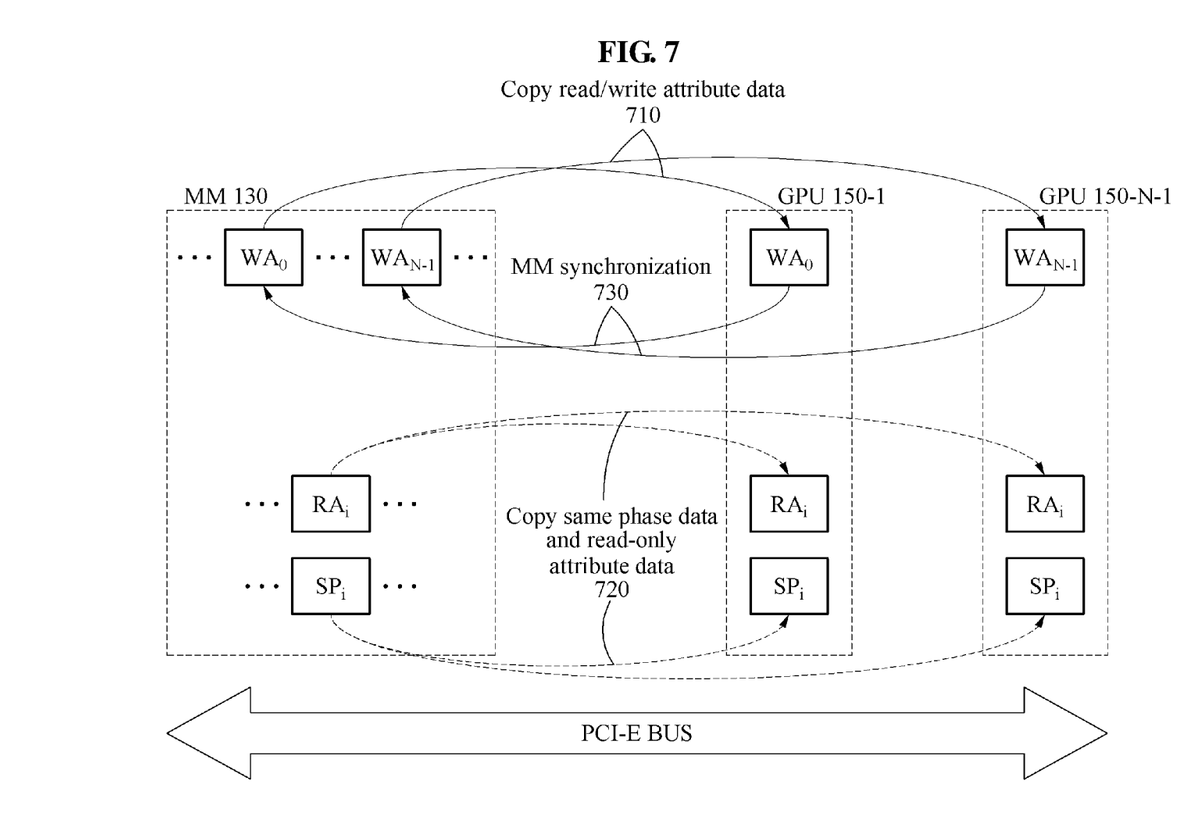

FIGS. 6 and 7 are diagrams illustrating a data flow and a synchronization flow based on an execution strategy according to an example embodiment.

In FIGS. 6 and 7, WA and RA indicate read/write attribute data and read-only attribute data, respectively, and SP indicates phase data configured by a slotted page.

According to an example embodiment, a CPU may store pieces of graph data in a solid-state drive (SSD), and stream phase data of the graph data to thousands of GPUs through a PCI-E interface to perform a graph algorithm. The CPU may store only updatable attribute data in a GPU, and stream the phase data. Example embodiments described herein provides the graph algorithm that may effectively process large graphs using asynchronous GPU streams. The example embodiments suggest two strategies to improve performance or improve extendability using a plurality of GPUs and SSDs. Hereinafter, a performance-oriented execution strategy will be described with reference to FIG. 6, and an extension-oriented execution strategy will be described with reference to FIG. 7.

FIG. 6 is a diagram illustrating an example of a data flow shown when a control system performs a performance-oriented execution strategy.

In stage 610, in the performance-oriented execution strategy, a size of read/write attribute data is smaller than a capacity of a device memory of a single GPU, and thus the control system copies entire read/write attribute data to a read/write attribute data buffer of each of GPUs 150.

In stage 620, the control system copies different phase data and read-only attribute data to different GPUs. The control system streams pages of the different phase data, for example, $SP_k$, and the read-only attribute data, for example, $RA_k$, to the different GPUs. Each GPU independently performs a kernel function using the different phase data. Here, each GPU performs a kernel function $K_{SP}$ for a small page of the phase data. Alternatively, each GPU performs a kernel function $K_{LP}$ for a large page of the phase data. The small page and the large page of the phase data may be processed through a same method. Here, the GPUs independently perform a same GPU kernel function on different portions of the phase data. The read/write attribute data updated in stage 620 is synchronized based on the performance-oriented execution strategy in stages 630 and 640.

The control system synchronizes device memories (illustrated as DMs) of the GPUs in stage 630, and synchronizes a main memory (illustrated as MM) 130 in stage 640. In a case that each of the GPUs performs synchronization, a synchronization overhead may increase as the number of the GPUs increases. According to an example embodiment, using a peer-to-peer memory copy function of a GPU may reduce the synchronization overhead. This is because a period of time for performing the peer-to-peer memory copy function is relatively shorter than a period of time for transmitting data between the main memory 130 and the GPUs.

In stage 630, read/write attribute data of each of the GPUs is incorporated into a master GPU, for example, a first GPU.

In stage 640, updated read/write attribute data of the master GPU, for example, read/write attribute data into which the read/write attribute data of the GPUs is incorporated, is copied to the main memory 130.

Stage 610 may correspond to an 11th line of Table 1 above, and stage 620 to 16th through 26th lines of Table 1, and stages 630 and 640 to a 28th line of Table 1.

In a case of a sufficient data streaming capacity, the performance-oriented execution strategy may improve performance as the number of GPUs processing graph data increases. Further, the different phase data distributed to the GPUs may have practically the same size, and thus a same workload may be distributed to the GPUs. Thus, irrespective of a characteristic of a graph, for example, a size and a density of the graph, the performance of processing the graph may be improved.

A data streaming capacity may be determined by a speed of a PCI-E interface and an input and/or output (I/O) performance of the SSD. In a current computer structure, the I/O performance of the SSD, for example, 2 gigabytes per second (GB/s), is lower than the speed of the PCI-E interface, for example, 16 GB/s.

According to an example embodiment, using a plurality of SSDs as a main memory may increase the data streaming capacity. For example, each slotted page may be stored in a certain SSD, for example, an $SSD_{g(j)}$, in which a function $g(j)$ returns a hash value of j, which is a page ID, and a corresponding page may be fetched from the $SSD_{g(j)}$ at an I/O request in a 23rd line of Table 1.

For example, in a case that a size of graph data (G) is smaller than a main memory buffer (MMBuf), the graph data may all be loaded to the main memory buffer in 9th to 10th lines of Table 1. In such a case, the performance may be determined by the speed of the PCI-E interface.

FIG. 7 is a diagram illustrating an example of a data flow shown when the control system performs an extension-oriented execution strategy. In the extension-oriented execution strategy, different attribute data, for example, $WA_i$, is copied to a plurality of GPUs 150, and same phase data is streamed to all the GPUs 150.

In stage 710, since a size of read/write attribute data is greater than a capacity of a device memory of a single GPU in the extension-oriented execution strategy, a control system divides read/write attribute data into the number of pieces of read/write attribute data corresponding to the number of the GPUs 150 and copies the read/write attribute data to a read/write attribute data buffer of each GPU. In stage 710, the control system copies the different pieces of read/write attribute data, for example, $WA_i$, to each GPU.

In stage 720, the control system copies same phase data and read-only attribute data to different GPUs, and the GPUs independently perform a kernel using the same phase data. In stage 720, while same $SP_j$ and $RA_j$ are being streamed to all the GPUs 150, each GPU performs a given kernel function. Here, each GPU performs a kernel function, for example, $K_{SP}$, for a small page (SP) of phase data. Alternatively, each GPU performs a kernel function, for example, $K_{LP}$, for a large page (LP) of phase data. The small page and the large page of the phase data may be processed through a same method. Here, the GPUs 150 may independently perform a same kernel function on different portions of attribute data. In stage 730, all read/write attribute data updated in stage 720, for example, $\{WA_i\}$, is synchronized in stage 730. Fragments of the read/write attribute data $WA_i$ are separate from one another, and thus a peer-to-peer memory copy function of a GPU may not be used.

In stage 730, the control system performs synchronization based on the extension-oriented execution strategy. In stage 730, the control system performs the synchronization by a total of N times from each GPU to a main memory.

Stage 710 may correspond to an 11th line of Table 1 above, stage 720 to 16 through 26 lines of Table 1, and stage 730 to a 28th line of Table 1.

The extension-oriented execution strategy may maximize a size of a graph to be processed. In a case of a sufficient transmission capacity of an SSD or the main memory, the size of the graph to be processed may increase as the number of GPUs increases. Further, different attribute data distributed to a plurality of GPUs may have a practically same size, and same phase data may be transmitted to the GPUs. Thus, a same workload may be distributed to the GPUs. Thus, irrespective of a characteristic of the graph, for example, the size and a density of the graph, the workload may be evenly distributed.

The extension-oriented execution strategy may be logically similar to using a single GPU having a large device memory. Thus, although the number of GPUs increases, performance in processing graph data may not change and a capacity of streaming data to a GPU may not change.

In a case that a main memory with a large capacity to store an entire graph is present, performance may be determined by a speed of a PCI-E interface. Otherwise, the performance may be determined by an I/O performance of an SSD. In such a case, using a plurality of SSDs may improve the performance.

As described above, the extension-oriented execution strategy may be suitable to process a relatively large graph of which read/write attribute data may not be stored in a device memory of a single GPU. In contrast, the performance-oriented execution strategy may be suitable to process a relatively small graph of which read/write attribute data may be stored in a device memory of a single GPU.

Figure 8:
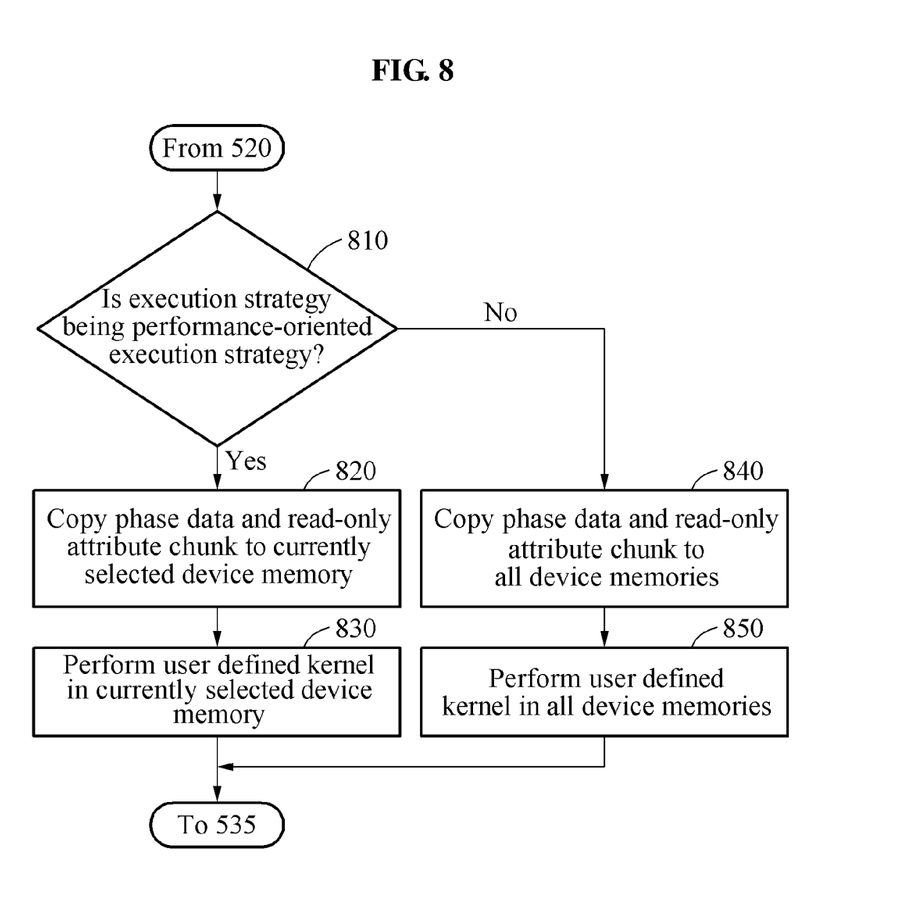
FIG. 8 is a flowchart illustrating a flow of operations performed by a graph processing system based on an execution strategy in a graph processing process according to an example embodiment.

FIG. 8 is a flowchart illustrating a flow of operations performed by a graph processing system based on an execution strategy in a graph processing process according to an example embodiment. The operations to be described hereinafter may be performed between operation 525 of copying phase data and a read-only chunk that is described with reference to FIG. 5 and operation 530 of performing a user defined kernel based on an execution strategy that is described with reference to FIG. 5.

As descried with reference to FIG. 5, when copying the phase data and the read-only chunk to a device memory from a graph processing thread, a control system may copy the phase data and the read-only chunk to a device memory of a selected GPU based on each execution strategy. The control system may then perform the user defined kernel using a core and the device memory of the selected GPU based on each execution strategy.

In detail, in operation 810, the control system determines whether the execution strategy is a performance-oriented execution strategy. In operation 820, in response to the execution strategy being the performance-oriented execution strategy as a result of the determining in operation 810, the control system selects a GPU among a plurality of GPUs, and copies phase data and a read-only chunk to a device memory of the selected GPU. Here, the control system may select the GPU from the GPUs using a hash function.

In operation 830, the control system performs a user defined kernel using a core and the device memory of the GPU selected by the control system in operation 820 based on the performance-oriented execution strategy.

Here, the control system may use a plurality of graph processing threads that perform operations 820 and 830 with respect to the GPUs. The graphic processing threads may be performed in parallel with one another.

In operation 840, in response to the execution strategy not being the performance-oriented execution strategy, or the execution strategy being an extension-oriented execution strategy, as the result of the determining in operation 810, the control system copies the phase data and the read-only chunk to device memories of all the GPUs.

In operation 850, the control system performs the user defined kernel using cores and the device memories of all the GPUs.

When the performing of the user defined kernel is terminated, the control system informs a buffer manager of information about phase data for which query processing is performed so that the buffer manager updates information about a space of a main memory.

When the query processing is completely terminated, a result processor copies attribute data present in the device memories of the GPUs to the main memory, and synchronizes the attribute data. The result processor stores, in an auxiliary memory, the synchronized attribute data present in the main memory.

The units described herein may be implemented using hardware components, software components and/or a combination thereof. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A graph processing system comprising:
 at least one auxiliary memory configured to store graph data including graph topology data and attribute data;
 a plurality of graphics processing units (GPUs) configured to process the graph data;
 a main memory provided between the auxiliary memory and the GPUs, and configured to cache at least a portion of the graph data; and
 a central processing unit (CPU) configured to:
 determine whether updatable attribute data of the attribute data is storable in a device memory included in each of the GPUs;
 based on the determination, copy the updatable attribute data to device memories of the GPUs based on an execution strategy used for processing the graph data;
 generate a loading list by determining the graph topology data to be loaded to the main memory among pieces of the graph topology data stored in the at least one auxiliary memory;
 load the graph topology data included in the loading list from the at least one auxiliary memory to the main memory based on whether a loading space is present in the main memory; and
 stream the graph topology data loaded in the main memory and corresponding read-only attribute data to the device memories based on the execution strategy.

2. The graph processing system of claim 1, wherein, in response to the updatable attribute data being storable in the device memory of each of the GPUs, the CPU is configured to store the updatable attribute data in the device memory of each of the GPUs.

3. The graph processing system of claim 1, wherein, in response to the updatable attribute data not being storable in the device memory of each of the GPUs, the CPU is configured to divide the updatable attribute data and store the updatable attribute data obtained through the dividing in the device memory of each of the GPUs.

4. The graph processing system of claim 1, wherein the CPU is configured to compare a size of the updatable attribute data and a size of a device memory of a single GPU,
 wherein, in response to the size of the device memory of the single GPU being greater than or equal to the size of the updatable attribute data, the CPU is configured to apply a performance-oriented execution strategy to process the graph data, and
 in response to the size of the device memory of the single GPU being less than the size of the updatable attribute data, the CPU is configured to apply an extension-oriented execution strategy to process the graph data.

5. The graph processing system of claim 1, wherein the at least one auxiliary memory is configured to store graph data with a capacity greater than a capacity of the main memory.

6. The graph processing system of claim 1, wherein the graph topology data includes information about vertices included in the graph data and information about a connection between the vertices, and
 the attribute data includes the updatable attribute data and read-only attribute data.

7. The graph processing system of claim 1, wherein the CPU is configured to asynchronously stream the graph topology data from the at least one auxiliary memory to the main memory, and asynchronously stream the graph topology data from the main memory to the device memory of each of the GPUs.

8. The graph processing system of claim 1, wherein the graph topology data includes a plurality of pages having a variable size,
 wherein the pages include slots,
 wherein each of the slots includes a page identification (ID) number configured by a byte, and a slot offset.

9. The graph processing system of claim 1, wherein the CPU is further configured to:
 process a transmission of the graph data among the device memory of each of the GPUs, the at least one auxiliary memory, and the main memory;
 determine the execution strategy to be used for query processing associated with the graph data based on a size of the graph data and a capacity of the device memory;
 protect an area of the main memory based on whether a graph topology page to be transmitted to the device memory is present in the main memory during the query processing associated with the graph data;
 control the GPUs; or
 store, in the at least one auxiliary memory, a result of the query processing associated with the graph data.

10. The graph processing system of claim 9, wherein the CPU is further configured to simultaneously read pages of graph topology data different between the at least one auxiliary memory using a hash operation, and load the read pages to the main memory, and
 control the device memories of the GPUs to process the graph data during the loading of the pages.

11. A graph processing method comprising:
 copying updatable attribute data required for graph processing to device memories of graphics processing units (GPUs) based on an execution strategy used for the graph processing;
 verifying whether graph topology data required for the graph processing is loaded in a main memory;
 generating a loading list by determining the graph topology data to be loaded to the main memory among pieces of the graph topology data stored in at least one auxiliary memory;
 loading the graph topology data included in the loading list from the at least one auxiliary memory to the main memory based on whether a loading space is present in the main memory;
 streaming the graph topology data loaded in the main memory to the device memories based on the execution strategy;
 performing a user defined kernel in which query processing based on the execution strategy is embodied; and
 synchronizing a result of the query processing based on the execution strategy.

12. The graph processing method of claim 11, further comprising:
 generating at least one access thread configured to access the auxiliary memory to load the graph topology data included in the loading list,
 wherein each of the at least one access thread is configured to determine an auxiliary memory to be accessed through a hash operation with respect to a page identification (ID) of the graph topology data to be loaded by each of the at least one access thread.

13. The graph processing method of claim 11, wherein, in response to the execution strategy for the graph processing being a performance-oriented execution strategy, the copying comprises copying the updatable attribute data identically to the device memories of the GPUs, and
the streaming comprises copying different graph topology data to the device memories of the GPUs.

14. The graph processing method of claim 11, wherein, in response to the execution strategy for the graph processing being an extension-oriented execution strategy, the copying comprises copying different portions of the updatable attribute data to the device memories of the GPUs, and
the streaming comprises copying same graph topology data to the device memories of the GPUs.

15. The graph processing method of claim 11, wherein, in response to the execution strategy being a performance-oriented execution strategy, the synchronizing comprises:
collecting updatable attribute data stored in the device memories of the GPUs into a representative GPU among the GPUs; and
synchronizing the collected updatable attribute data to the main memory.

16. The graph processing method of claim 11, wherein, in response to the execution strategy being an extension-oriented execution strategy, the synchronizing comprises:
synchronizing updatable attribute data stored in the device memories of the GPUs to the main memory.

17. A non-transitory computer readable medium storing computer-readable program code executable by at least one processor to:
copy updatable attribute data required for graph processing to device memories of graphics processing units (GPUs) based on an execution strategy used for the graph processing;
verify whether graph topology data required for the graph processing is loaded in a main memory;
generate a loading list by determining the graph topology data to be loaded to the main memory among pieces of the graph topology data stored in at least one auxiliary memory;
load the graph topology data included in the loading list from the at least one auxiliary memory to the main memory based on whether a loading space is present in the main memory;
stream the graph topology data loaded in the main memory to the device memories based on the execution strategy;
perform a user defined kernel in which query processing based on the execution strategy is embodied; and
synchronize a result of the query processing based on the execution strategy.

* * * * *